(12) United States Patent
Christiansen

(10) Patent No.: US 11,940,355 B2
(45) Date of Patent: Mar. 26, 2024

(54) WIND TURBINE ROTOR BLADE LOAD EMULATOR ARRANGEMENT

(71) Applicant: Siemens Gamesa Renewable Energy A/S, Brande (DK)

(72) Inventor: Soeren Christiansen, Støvring (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 17/770,370

(22) PCT Filed: Oct. 9, 2020

(86) PCT No.: PCT/EP2020/078434
§ 371 (c)(1),
(2) Date: Apr. 20, 2022

(87) PCT Pub. No.: WO2021/083638
PCT Pub. Date: May 6, 2021

(65) Prior Publication Data
US 2022/0381640 A1 Dec. 1, 2022

(30) Foreign Application Priority Data
Oct. 28, 2019 (EP) .................................. 19205607

(51) Int. Cl.
*G01M 5/00* (2006.01)
*G01M 7/02* (2006.01)
(52) U.S. Cl.
CPC ........ *G01M 5/0016* (2013.01); *G01M 5/0058* (2013.01); *G01M 7/027* (2013.01)

(58) Field of Classification Search
CPC ............................. G01M 5/0058; Y02E 10/72
See application file for complete search history.

(56) References Cited

U.S. PATENT DOCUMENTS

| | | | | |
|---|---|---|---|---|
| 5,405,246 A | * | 4/1995 | Goldberg | ................ F03D 80/40 |
| | | | | 416/DIG. 8 |
| 2010/0263453 A1 | * | 10/2010 | Mason | ..................... G01N 3/04 |
| | | | | 73/826 |

(Continued)

FOREIGN PATENT DOCUMENTS

| CN | 104854442 A | 8/2015 |
|---|---|---|
| CN | 105466672 A | 4/2016 |

(Continued)

OTHER PUBLICATIONS

PCT International Search Report and Written Opinion of International Searching Authority dated Jan. 27, 2021 corresponding to PCT International Application No. PCT/EP2020/078434 filed Sep. 10, 2020.

*Primary Examiner* — Long T Tran
(74) *Attorney, Agent, or Firm* — Schmeiser, Olsen & Watts, LLP

(57) ABSTRACT

A wind turbine rotor blade load emulator arrangement includes a support unit constructed to support a rotor blade during a fatigue test procedure; an exciter configured to deflect the rotor blade during a fatigue test procedure; and a stiffness augmentation assembly for mounting to the rotor blade over a mounting length, which stiffness augmentation assembly is realized to increase the stiffness of the rotor blade in the mounting length. A method of carrying out a fatigue test procedure on a wind turbine rotor blade uses such a load emulator arrangement.

14 Claims, 4 Drawing Sheets

(56) References Cited

U.S. PATENT DOCUMENTS

| | | | |
|---|---|---|---|
| 2011/0041617 A1* | 2/2011 | Cotrell | F03D 17/00 73/660 |
| 2012/0020798 A1* | 1/2012 | Barnsley | F03D 1/0633 416/223 R |
| 2012/0141283 A1* | 6/2012 | Bell | F03D 1/0675 29/889.7 |
| 2016/0363518 A1 | 12/2016 | Sever et al. | |
| 2017/0241860 A1 | 8/2017 | Richards et al. | |
| 2020/0011760 A1 | 1/2020 | Richards et al. | |

FOREIGN PATENT DOCUMENTS

| | | |
|---|---|---|
| CN | 106248331 A | 12/2016 |
| CN | 107038311 A | 8/2017 |
| CN | 107110736 A | 8/2017 |
| CN | 110177938 A | 8/2019 |
| EP | 2848910 A1 | 3/2015 |
| EP | 3677891 A1 | 7/2020 |
| EP | 3730916 A1 | 10/2020 |
| EP | 3805724 A1 | 4/2021 |
| KR | 20140104517 A | 8/2014 |
| WO | 2010069926 A2 | 6/2010 |
| WO | 2017162251 A2 | 9/2017 |

\* cited by examiner

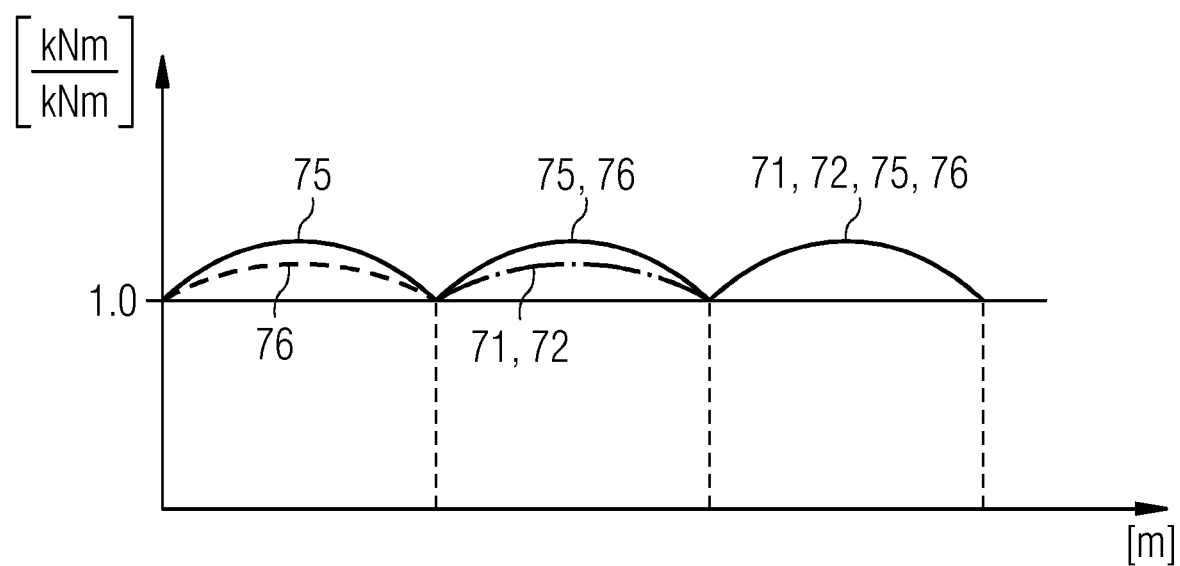

WIND TURBINE ROTOR BLADE LOAD EMULATOR ARRANGEMENT

CROSS-REFERENCE TO RELATED APPLICATIONS

This application claims priority to PCT Application No. PCT/EP2020/078434, having a filing date of Oct. 9, 2020, which claims priority to EP Application No. 19205607.5, having a filing date of Oct. 28, 2019, the entire contents both of which are hereby incorporated by reference.

FIELD OF TECHNOLOGY

The following relates to a wind turbine rotor blade load emulator arrangement, and a method of carrying out a material test procedure on a wind turbine rotor blade using such a load emulator arrangement.

BACKGROUND

A wind turbine rotor blade is generally subject to rigorous material testing before approval is given to commence series manufacture. It is known to mount load introduction fixtures such as load frames at intervals along a wind turbine rotor blade and to implement an exciter to effect oscillation of the rotor blade. A load frame is generally a heavy fitting, for example made of wood, and shaped to be tightly clamped about the rotor blade at a specific position along its length. For a rotor blade with a length of 50 m or more, several such load frames may be used, each of which is custom-made to be mounted at a specific position along the blade's length. The size and weight of a load frame is directly related to the dimensions of the rotor blade at its mounting position, so that a load frame for mounting in the rotor blade outboard region will be relatively small and light, but a load frame for mounting in the inboard region will be large and heavy. The weight of each load frame must be carefully calculated so that each load frame achieves a desired dynamic moment at its mounting position but does not result in overloading in a different region of the rotor blade.

One end of the rotor blade—usually the circular and comparatively stiff root end—is secured to a rigid or immobile supporting block or foundation. An electric or hydraulic exciter is coupled to one or more of the load frame fittings, for example by means of a rod. To carry out the fatigue test, the exciter repeatedly moves the actuator back and forth, thereby effecting an oscillation of the rotor blade. The cyclic loading can continue for a suitable duration to emulate the long-term damage caused by wind loading, wind gusts, turbulence etc. During the fatigue test, data is generally collected from various sensors mounted on the surface of the rotor blade and/or in the body of the rotor blade. For example, a plurality of resistance strain gauges can provide an accurate picture of how the rotor blade is affected by flap-wise and/or edge-wise bending moments. After a fatigue test is completed, the rotor blade may additionally undergo a visual inspection, an ultrasound inspection, or any other suitable inspection.

IEC standard 61400-23:2014 ('Full-scale structural testing of rotor blades') stipulates that the region up to 75% of chord length on either side of a load frame must be excluded from a fatigue test, since a load frame acts to stiffen the blade. Therefore, in order to carry out a meaningful load test for a rotor blade, the number of load frames is kept to a small number. For example, in the case of a very long rotor blade of the type being used more widely in modern wind parks, with a length in the order of 100 m, a fatigue test requires 4-7 large (i.e., heavier) load frames. However, a large load frame fitting is cumbersome to handle and must generally be hoisted into place using lifting apparatus such as a crane. The relatively vulnerable rotor blade can easily be damaged during such a mounting procedure by the steel frame of the load frame or by any chains, slings etc. of the lifting apparatus. Furthermore, during a fatigue test on a long rotor blade with a large diameter root end and correspondingly heavy load frames, the necessarily large exciter amplitude (to achieve the target oscillations in the root end) results in undesirably large oscillations in the shoulder or transition region of the rotor blade, which may result in blade failure. Another problem with large load frames is that friction at the contact between the load frame and the rotor blade surface during a fatigue test can heat the contact area to such an extent that it becomes brittle and deteriorates. Such damage caused by the test rig is inconvenient and adds significantly to the overall cost of developing a wind turbine rotor blade.

For these reasons, the need to use larger load frame fittings can make it difficult to plan and implement a fatigue test for such a long rotor blade. Furthermore, the maximum permissible weight of a load frame may be limited by safety requirements.

Such weight restrictions effectively limit the scope of a fatigue test so that it may be impossible to obtain a thorough understanding of the rotor blade's ability to withstand loading. Without such information, it may be difficult to establish an accurate prediction of the lifetime of the rotor blade, or to predict how the rotor blade will perform over its expected lifetime.

SUMMARY

An aspect relates to provide an improved way of carrying out a fatigue test on a wind turbine rotor blade.

According to an embodiment of the invention, the wind turbine rotor blade load emulator arrangement or 'test rig' comprises a support unit or foundation constructed to support a rotor blade during a fatigue test procedure; an exciter configured to apply a force to the rotor blade during a fatigue test procedure; and a stiffness augmentation assembly for mounting to the rotor blade, which stiffness augmentation assembly is realised to increase the stiffness of the rotor blade in the mounting region.

In the context of the embodiments, the stiffness augmentation assembly shall be understood to be mounted to the rotor blade over a mounting region, and to take effect over that region. In other words, the stiffness augmentation assembly increases the rotor blade stiffness in the mounting region. The advantage of the inventive test rig is that by deliberately increasing the rotor blade stiffness in a specific region, the load frames can be reduced.

According to the embodiments, the method of carrying out a fatigue test procedure on a wind turbine rotor blade using such a load emulator arrangement comprises the steps of securing the root end of a rotor blade to the support unit; mounting the stiffness augmentation assembly to the rotor blade; connecting the exciter to the rotor blade; and actuating the exciter for a predetermined duration to subject the rotor blade to cyclic loading.

An advantage of the inventive method is that the stiffness augmentation assembly effectively prevents undesirably large oscillations of the rotor blade, thereby reducing the likelihood of damage to the rotor blade during a fatigue test and increasing the value of the data collected during the fatigue test.

In the following, it may be assumed that the wind turbine rotor blade has a length in the order of 100 m. It may also be assumed that the root end of the rotor blade has a diameter in the order of 4 m, and that the cylindrical root end extends over a length in the region of 10 m.

The expressions 'fatigue test', 'material test' and 'load test' may be regarded as synonyms and are used interchangeably in the following. The terms 'load emulator arrangement' and 'test rig' are synonyms and may be used interchangeably in the following.

The stiffness augmentation assembly can be realized in any appropriate manner. In a particularly exemplary embodiment of the invention, the stiffness augmentation assembly comprises a first end fitting mounted at a first position on the rotor blade, a second end fitting mounted at a second position on the rotor blade, and a tensile element extending between the end fittings. In a exemplary embodiment of the invention, the distance between the end fittings comprises 10% of the rotor blade length. In the context of embodiments of the invention, each end fitting shall be understood to be securely mounted to the rotor blade and may be realised to be tightly clamped about the rotor blade.

The tensile element shall be understood to be attached between the end fittings in such a way that these exert a tensile force on each other. The effect of this construction is to increase the rotor blade stiffness in the region between the end fittings. The stiffness augmentation assembly is therefore less flexible than the rotor blade over that region. The flexibility of the stiffness augmentation assembly is at most 75% of the flexibility of the rotor blade over that length.

There are various ways of realizing the tensile element. In an exemplary embodiment of the invention, the tensile element comprises at least one spring extending between the first end fitting and the second end fitting. Several identical springs are arranged equidistantly about the circumference of the rotor blade. In such an arrangement, the stiffness augmentation assembly can very effectively increase the rotor blade stiffness over that region.

In an alternative embodiment of the invention, the tensile element comprises an elastic or tensile 'hose' extending between the first end fitting and the second end fitting. For example, a wire mesh, a glass fiber mesh, a carbon fiber mesh etc., in the form of a hose can extend between the end fittings. The density of the mesh and the choice of material can be chosen to achieve a desired increase in rotor blade stiffness in that region.

The tensile element can be any arrangement of fixtures (springs, tendons, mesh) which, when mounted between the end fittings, ensures that the flexibility of the stiffness augmentation assembly is less than the flexibility of the rotor blade in that region.

In a exemplary embodiment of the invention, the stiffness augmentation assembly comprises an adjustable tensile element, i.e., a tensile element that can be adjusted or tuned to obtain a desired degree of added rotor blade stiffness. This can be achieved, for example, by appropriate pre-tensioning of a spring element.

The stiffness augmentation assembly is mounted to the blade close to or adjacent to the root end region, to avoid the need for heavy and unwieldy load frame fittings in that part of the rotor blade.

In a particularly exemplary embodiment of the invention, the stiffness augmentation assembly is mounted directly in the root end region. In such an embodiment, the first end fitting is mounted to the support unit, and the second end fitting is mounted at a distance along the root end of the blade. The advantage of such an arrangement is that there is no need for a yoke at the innermost end of the rotor blade.

An end fitting of the stiffness augmentation assembly can be realized as a yoke that is clamped about the rotor blade. Alternatively, an end fitting may comprise a pair of plates that are attached on opposite sides of the rotor blade. The plate, for example a metal plate or a plate made of glass fibre material, is attached to the rotor blade surface by an adhesive bond. Each plate also comprises a means of connecting it to a tensile element such as a spring. In such a realization, tensile elements can extend between the plates of two end fittings, or between the supporting structure and the plates of one end fitting.

An advantage of using adhesive plates instead of a clamped yoke or load frame is the reduction in static load. Furthermore, load introduction to the blade is significantly more precise compared to a clamped yoke, for which it is not possible to determine exactly the points at which the load is transferred to the rotor blade.

The inventive test rig also comprises a number of load emulator fittings or load frames realized for attaching to a rotor blade. Each load frame can be constructed as known from the conventional art, for example as a wooden 'yoke' that is shaped to be clamped about a specific part of the rotor blade and which is contained in a steel frame. Each load emulator fitting that is to be mounted at a specific position on the airfoil part of the rotor blade will be shaped to fit about the curved profile at that position. For a rotor blade with a length in the order of 100 m, the inventive test rig may implement five or more load frames.

A load frame is realized for connection to an exciter, for example it may be constructed to have a means of connecting it to a rigid actuator rod or linkage rod extending from the exciter.

To carry out the fatigue test using the inventive test rig, the stiffness augmentation assembly is put into place in or near the root end region, a suitable number of load emulator fittings are mounted to the rotor blade, and at least one of these is connected to an actuator of the exciter. The exciter is then activated to make the rotor blade oscillate in a controlled manner. The cyclic loading continues for a predetermined length of time, during which data can be collected from sensors such as strain gauges mounted on the rotor blade.

BRIEF DESCRIPTION

Some of the embodiments will be described in detail, with reference to the following figures, wherein like designations denote like members, wherein:

FIG. 7 shows graphs of normalized deflection during testing of a rotor blade.

DETAILED DESCRIPTION

Figure 1:
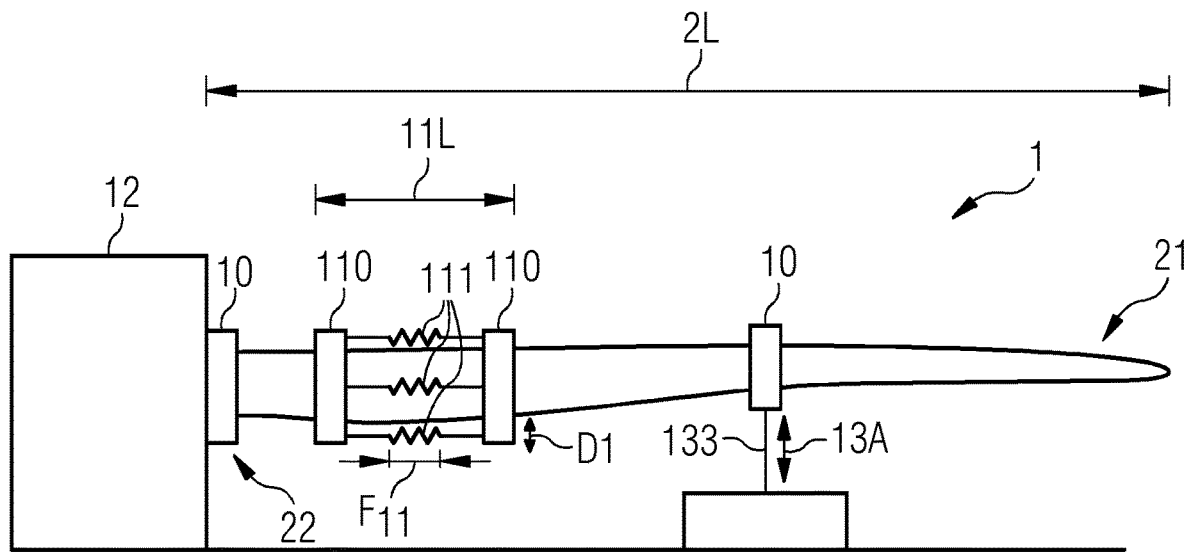
FIG. 1 shows embodiments of the inventive test rig.

FIG. 1 shows a first embodiment of the inventive test rig 1. The root end 22 of a rotor blade 2 has been mounted to a supporting block 12 or foundation 12. The drawing shows the assembly as a horizontal arrangement, but it shall be understood that the rotor blade may be mounted vertically to the supporting block 12. Here, a number of load emulator fittings 10 in the form of load frames have been clamped about a wind turbine rotor blade 2 at predetermined intervals. The mass of an outboard load emulator fitting 10 near the rotor blade tip end 21 may be in the order of 200 kg. The mass of a load emulator fitting 10 increases towards the inboard end or root end 22, i.e., heavier fittings are required near the root end 22. Near the inboard end 22, instead of simple load frames, a stiffness augmentation assembly 11 is mounted to the rotor blade over a region 11L extending from 2% to 30% of the rotor blade length 2L. In this embodiment, the stiffness augmentation assembly 11 comprises two end fittings 110 that are clamped about the rotor blade 2, and a number of tensioning fixtures 111 extending between the end fittings 110. The tensioning fixtures 111 exert a pulling force $F_{11}$ between the end fittings 110, which manifests as an increase in stiffness of the rotor blade 2 along that mounting region 11L. The direction of tensile force $F_{11}$ or pulling force $F_{11}$ is parallel to the surface of the rotor blade 2. The tensioning fixtures 111 can be any structures that achieve the desired pulling force $F_{11}$ between the end fittings 110, for example tensioning rods, pre-tensioned springs, pre-tensioned cables, pressure springs, etc. The stiffness augmentation assembly 11 is constructed so that, when mounted to the rotor blade 2, the stiffness of the stiffness augmentation assembly 11 is greater than the stiffness of the rotor blade 2 over the mounting region 11L.

The diagram also shows an exciter 13 coupled by a rigid actuator 133 to one of the load emulator fittings 10. To carry out a materials test, the exciter 13 is operated for a predetermined duration to subject the rotor blade 2 to cyclic loading. A materials test can be planned to deflect the coupled load emulator fitting 10 by a specific amplitude 13A, i.e., the stroke of the actuator 133 as indicated in the diagram, at a predetermined rate or frequency, for a predetermined number of oscillations.

The effect of the stiffness augmentation assembly 11 is to reduce or suppress oscillations in the rotor blade inboard end 22, thereby preventing overshoot during a fatigue test. The reduced deflection D1 of the rotor blade 2 in this region is indicated in the diagram. By using the stiffness augmentation assembly 11, the actuator stroke 13A and/or the actuator speed and/or the test duration can be increased, so that more thorough and informative test results can be obtained while avoiding critical over-oscillation at any point along the rotor blade 2. Although not shown in the diagram, an arrangement of strain gauges may be provided, for example every 1-5 metres.

Figure 2:
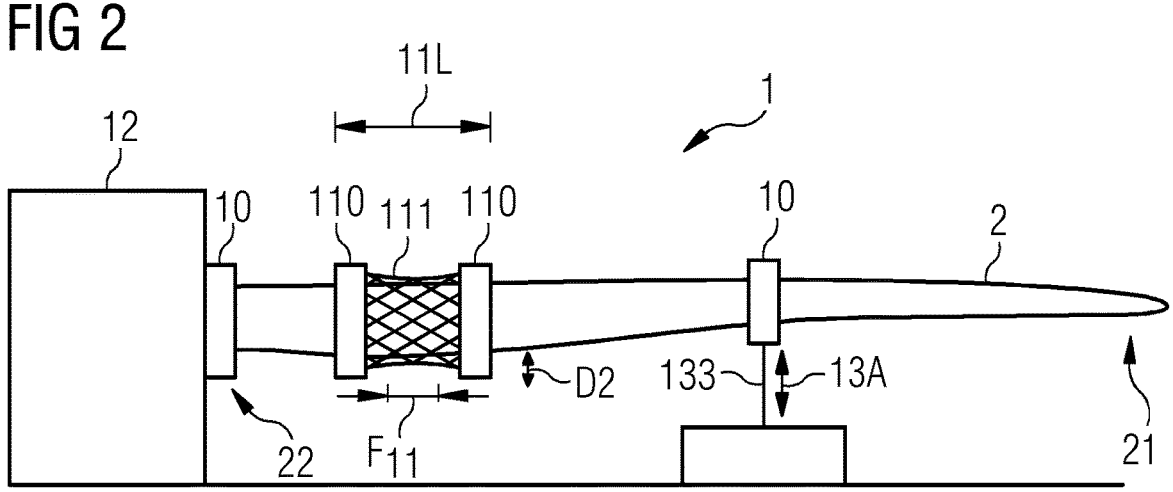
FIG. 2 shows an alternative embodiment, in which the stiffness augmentation assembly comprises a mesh as tensioning fixture connected between two end fittings.

FIG. 2 shows an alternative embodiment, in which the stiffness augmentation assembly 11 comprises a mesh 111 as tensioning fixture connected between two end fittings 110. The mesh 111 is constructed to effect a pulling force $F_{11}$ or tension between the end fittings 110. An advantage of this construction is that the load can be distributed more evenly compared to the use of individual springs as mentioned in FIG. 1 above, since a discrete spring exerts its pulling force essentially in one main direction. The reduced deflection D2 of the rotor blade 2 in this region is indicated in the diagram.

In FIG. 1 and FIG. 2, the end fittings 110 of the stiffness augmentation assembly 11 can be realised as load frames 10 or simple yokes, constructed primarily with the aim of clamping securely about the body of the rotor blade 2 to act as an anchor for the stiffness augmentation assembly 11

Figure 3:
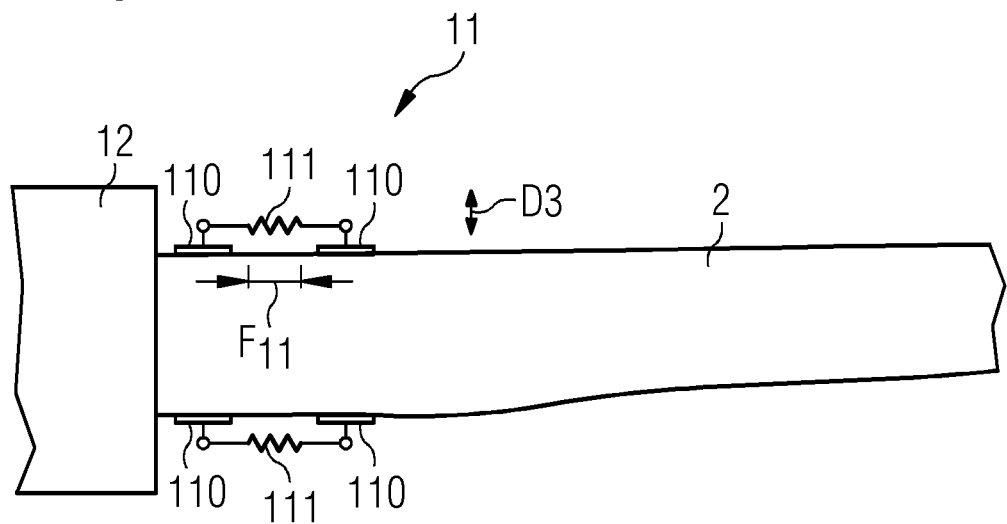
FIG. 3 shows an alternative embodiment of the stiffness augmentation assembly in which the end fitting is provided in the form of two plates that are bonded by adhesive to the rotor blade surface on opposite sides of the rotor blade.
Figure 4:
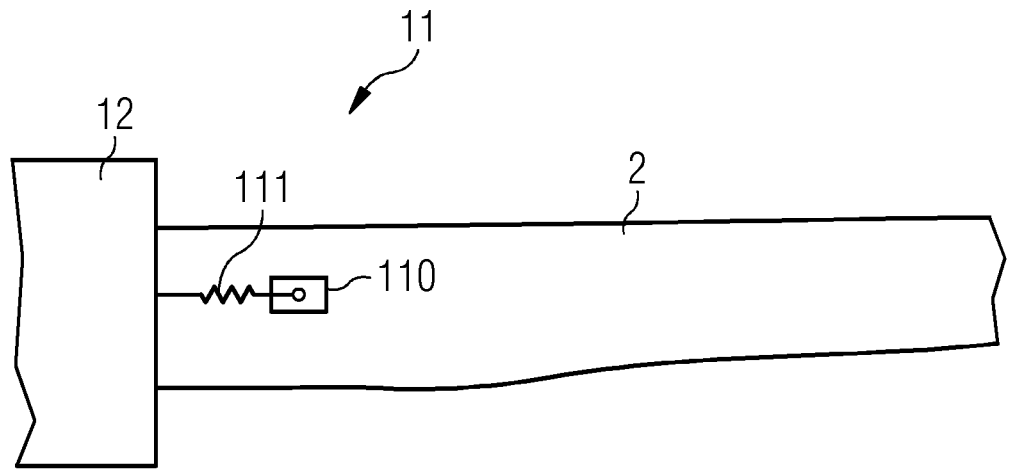
FIG. 4 is another simplified schematic that shows an embodiment in which both end fittings of the stiffness augmentation assembly are realized by plates attached to the rotor blade surface.

FIG. 3 shows an alternative realization of the stiffness augmentation assembly 11 in which the end fitting 110 is provided in the form of two plates that are bonded by adhesive to the rotor blade surface on opposite sides of the rotor blade 2. The diagram shows one plate facing the viewer, and the other plate of this end fitting 110 may be assumed to be attached on the opposite side of the rotor blade 2. In this embodiment, a tensile element 111 extends between a plate and the supporting block 12. Here also, the direction of tensile force is parallel to the surface of the rotor blade 2. The reduced deflection D3 of the rotor blade 2 in this region is indicated in the diagram. FIG. 4 is another simplified schematic that shows an embodiment in which both end fittings 110 of the stiffness augmentation assembly 11 are realized by plates attached to the rotor blade surface, and each spring element 111 extends between a pair of plates. In the embodiments shown in FIG. 3 and FIG. 4, it shall be understood that a spring element 111 may be arranged very close to the rotor blade.

Figure 5:
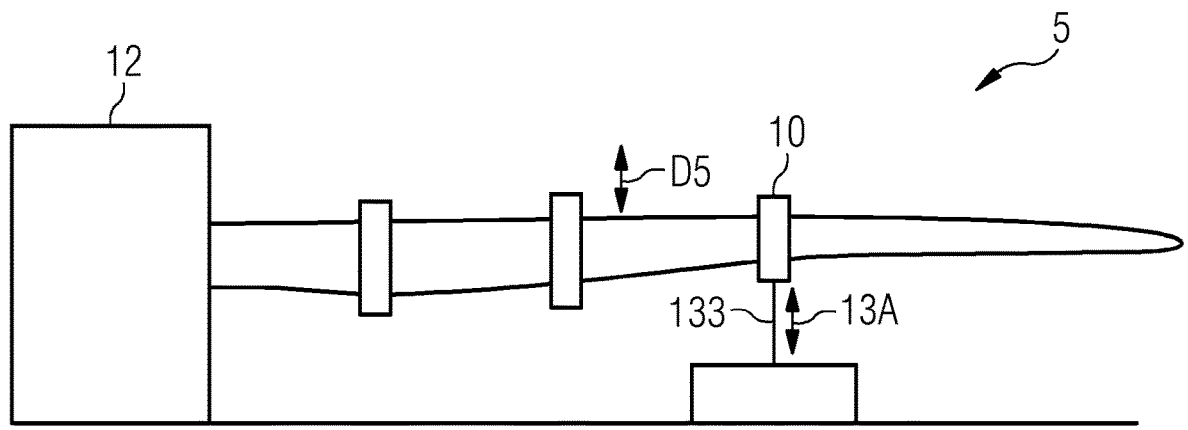
FIG. 5 shows a conventional art test rig.

FIG. 5 shows a conventional art test rig 5 for a wind turbine rotor blade 2. Here, several load frames 10 have been clamped about the rotor blade 2 along its length. The mass of an outboard load emulator fitting 10 near the rotor blade tip 21 may be in the order of 200 kg, while the mass of an inboard load emulator fitting 10 near the rotor blade root 22 may be up to 5000 kg. Such a heavy fitting can result in overloading during a fatigue test, indicated by the larger deflection D5, and the resulting undesirable 'overtesting' detracts from the quality of the data collected during the fatigue test and may even result in damage to the rotor blade.

Figure 6:
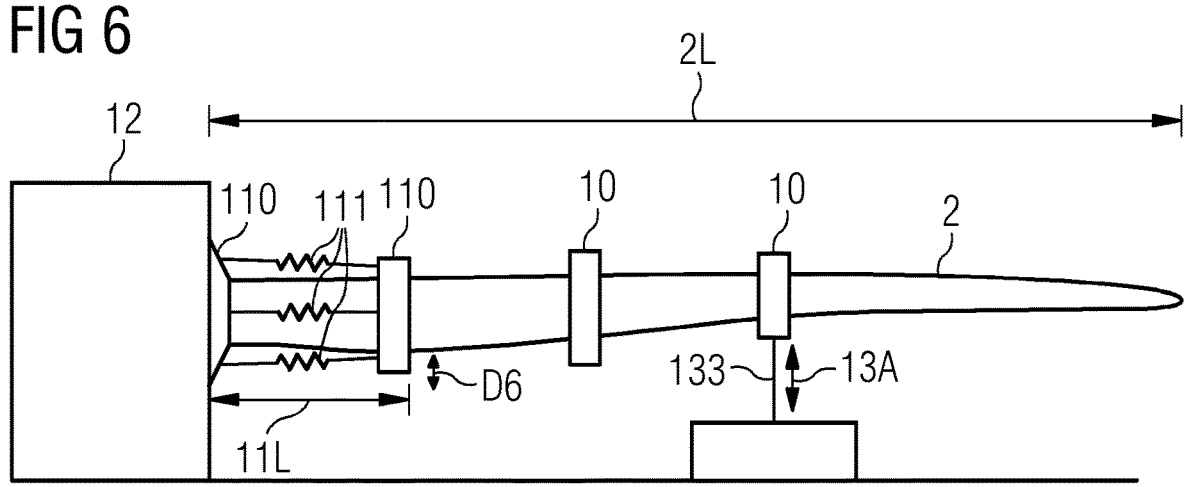
FIG. 6 shows a further embodiment of the inventive test rig.

FIG. 6 shows a further embodiment of the inventive test rig, in which the stiffness augmentation assembly 11 is mounted to the rotor blade over a mounting region 11L extending from 0% to 20% of the rotor blade length 2L. An advantage of this construction is that one end fitting 10 can be mounted also to the supporting block 12. The reduced deflection D6 of the rotor blade 2 in this region is indicated in the diagram.

FIG. 7 shows a number of graphs 71, 72, 76, 75 of scalar or normalized values of test moment (in kNm) divided by target moment (in kNm) over blade length L (in m) for the rotor blade test rigs described above. Graphs 71, 72 may be assumed to be essentially identical and correspond to the inventive test rigs shown in FIGS. 1 and 2. Graph 76 corresponds to the inventive test rig shown in FIG. 6. Graph 75 corresponds to the conventional art test rig shown in FIG. 5. It is assumed that the rotor blade is the same in each test rig. Ideally, an actual test moment is equal to the corresponding target moment, i.e. the quotient given by test moment divided by target moment is equal to 1. A scalar value of 1 applies when the actual deflection at a point along the rotor blade is the same as the target deflection at that point, and these converging points correspond to the positions of the fittings 10 clamped about the rotor blade 2. The diagram indicates four such nodes, corresponding to the positions of four fittings along the rotor blade. A quotient less than 1.0 indicates under-testing. A quotient greater than 1.0 indicates over-testing. The aim of embodiments of the invention is to provide a test rig that minimizes the likelihood of over-testing and which avoids under-testing. Graph

75 shows that the conventional art test rig results in over-testing at all regions of the rotor blade. Graphs 71, 72, 76 show that the inventive test rig can improve the test results over the regions with increased blade stiffness, i.e., over the regions in which the stiffness augmentation assembly is mounted.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements. The mention of 'a unit' does not preclude the use of more than one unit.

The invention claimed is:

1. A wind turbine rotor blade load emulator arrangement comprising:
   a support unit constructed to support a rotor blade during a fatigue test procedure, wherein a root end of the rotor blade is mounted to the support unit during the fatigue test procedure;
   an exciter configured to effect cyclic deflection of the rotor blade during a fatigue test procedure;
   a number of load emulator fittings, wherein a load emulator fitting is realized for attaching to the rotor blade; and
   a stiffness augmentation assembly for mounting to the rotor blade over a mounting length, which stiffness augmentation assembly is realized to increase the stiffness of the rotor blade in the mounting length.

2. The load emulator arrangement according to claim 1, wherein the stiffness augmentation assembly comprises a first end fitting mounted at a first position on the rotor blade, a second end fitting mounted at a second position on the rotor blade, and a tensile element extending between the end fittings.

3. The load emulator arrangement according to claim 2, wherein the distance between the end fittings comprises 2%-30% of the rotor blade length.

4. The load emulator arrangement according to claim 2, wherein the tensile element comprises at least one spring extending between the first end fitting and the second end fitting.

5. The load emulator arrangement according to claim 2, wherein the tensile element comprises a mesh extending between the first end fitting and the second end fitting.

6. The load emulator arrangement according to claim 2, wherein the first end fitting and the second end fitting define a mounting region extending between 0% and 20% of the rotor blade length.

7. The load emulator arrangement according to claim 2, wherein the first end fitting is mounted to the support unit.

8. The load emulator arrangement according to claim 1, wherein the stiffness of the stiffness augmentation assembly is at most 75% of the stiffness of the rotor blade over the mounting length.

9. The load emulator arrangement according to claim 1, wherein the stiffness augmentation assembly comprises an adjustable tensile element.

10. The load emulator arrangement according to claim 1, wherein a load emulator fitting is realized as a load frame.

11. The load emulator arrangement according to claim 1, comprising a plurality of load emulator fittings attached to the rotor blade at predefined intervals.

12. The load emulator arrangement according to claim 1, wherein a load emulator fitting comprises a metal plate attached to the rotor blade surface.

13. The load emulator arrangement according to claim 12, wherein a load emulator fitting is attached to the rotor blade surface by an adhesive bond.

14. A method of carrying out a fatigue test procedure on a wind turbine rotor blade, the method comprising:
   securing a root end of the wind turbine rotor blade to a support unit;
   mounting a stiffness augmentation assembly to the wind turbine rotor blade over a mounting length, wherein the stiffness augmentation assembly increases the stiffness of the wind turbine rotor blade in the mounting length;
   mounting a number of load emulator fittings to the wind turbine rotor blade;
   connecting an exciter to a load emulator fitting of the number of load emulator fittings; and
   actuating the exciter for a predetermined duration.

* * * * *